United States Patent Office 3,127,376
Patented Mar. 31, 1964

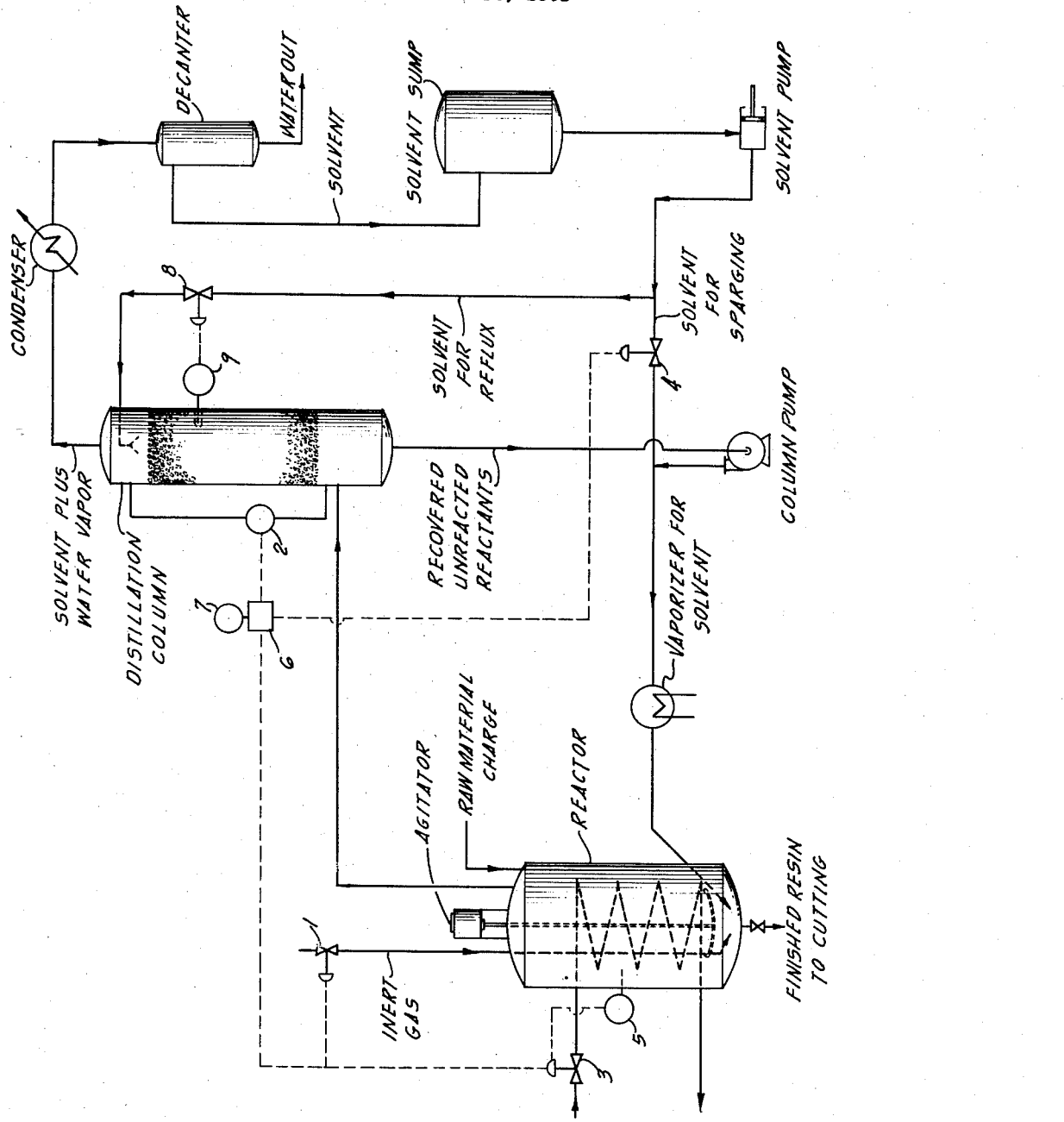

3,127,376
PROCESS FOR PRODUCING POLYESTER RESINS USING A SPARGE OF VAPORIZED, NORMALLY-LIQUID, INERT, WATER-IMMISCIBLE ORGANIC SOLVENT TO MAINTAIN AN ELEVATED BOIL-UP RATE
Abraham Lindenauer, Wallingford, Conn., and Richard N. Housekeeper, Pittsburgh, Pa., assignors to American Cyanamid Company, New York, N.Y., a corporation of Maine
Filed June 14, 1961, Ser. No. 117,046
10 Claims. (Cl. 260—75)

This invention relates to a novel process for preparing polyester resins. Furthermore, this invention relates to the use of a vaporized, normally-liquid inert, water-immiscible solvent to replace the inert stripping agent ordinarily used in polyester processing. Still further, this invention relates to a novel process for producing polyester resins with greatly reduced esterification times and losses of volatile reactants. The use of this process will also enable production of resins with highly reproducible properties attributed to the ease of control of reaction conditions. This invention further relates to a process whereby the desired boil-up rate is continuously and automatically maintained throughout the reaction cycle by addition of a vaporized, normally-liquid solvent below the surface of the reaction mass, when and as required. The vapors leaving the reaction sphere are passed through a distillation column which is automatically controlled so that the volatile reactants are recovered and returned to the reaction sphere, while water of reaction is removed from the system.

One of the objects of the present invention is to produce polyester resin compositions by a novel process in which polyhydric alcohol losses are significantly reduced.

A further object of the present invention is to produce polyester resin compositions in which the esterification kettle time is also appreciably reduced.

A further object of this invention is to make full use of the system's capacity to expel water of reaction during that part of the reaction when free boiling exists, and to determine automatically when the addition of an inert solvent vapor is required to maintain the desired boil-up rate. These and other objects of the present invention will be discussed in greater detail hereinbelow.

A standard procedure in polyester resin processing is to use a constant inert gas sparge throughout the reaction cycle. The inert gas serves to strip out water of reaction and to maintain a relatively oxygen-free atmosphere above the reaction mass. If the water of reaction is not removed as it is formed, the esterification reaction will be prohibitively long due to the reversible nature of the reaction. The presence of small quantities of free oxygen in the reaction sphere will cause discoloration of the polyester due to oxidation. General practice is to use an inert gas sparge rate equivalent to about 10% of the reactor content volume per minute, in cubic feet.

Polyester resins have as a general class a plurality of applications in industry. Unsaturated polyester resins such as those prepared by reacting a glycol with an apha, beta-ethylenically unsaturated dicarboxylic acid are useful in the field of laminating resins. Alkyd resins, on the other hand, such as those produced by reacting a polyhydric alcohol with a polycarboxylic acid free of non-benzenoid unsaturation, whether oil-modified or not, have utility in the field of coating compositions such as primers, flat wall paints, enamels, and the like. Regardless of the ultimate end use of these polyester resins, the initial processing is substantially the same, namely the reaction of a polycarboxylic acid with a polyhydric alcohol at esterification temperatures, namely above about 150° C. which results in the formation of water of esterification which needs to be removed from the esterification sphere in order that the polyester resin formation can proceed. In the production of polyester resins, the reaction tends to be at least in part a reversible one in which the esterification goes forward and produces the water of esterification and thereafter hydrolysis tends to set in breaking down the esterification product to its starting materials. It is then desirable to remove the water of esterification from the reaction vessel by an expeditious approach but it has been found that in the past the removal of said water results in the removal of small but significant quantities of unreacted reactants, namely, the polyhydric alcohol and/or the polycarboxylic acid. It is unquestionably desirable to remove the water of esterification but such removal carries with it the necessary evil of removing these unreacted reactants which may become lost to the process and, as a consequence, add to the cost of production of these polyester resins. We have found that by passing a vaporized inert, organic, normally-liquid solvent having a boiling point below 150° C. through the reacting reactants that we can remove the water of esterification and although additionally remove small quantities of the unreacted reactants, we are able to separate the water from the reactants in a condensation mechanism followed by the subsequent return of the solvent in combination with the condensed reactants to the reaction sphere. Furthermore, we have found that the use of an inert gas sweeping agent is of no appreciable benefit for removing water of reaction formed during early stages of an esterification reaction. During the early stages of the reaction the water will be removed due to free boiling of volatile reactants. We have also found that greatly reduced reaction cycle times are attained if throughout the reaction cycle there is maintained a vapor rate (henceforth called boil-up rate) leaving the reaction mass equivalent to 3 to 7 times the normal inert gas rate, and preferably 5 times. Further, we have found that this high boil-up rate can be maintained during the early stages of the esterification by evolution of volatile reactants plus water of reaction only and the use of an inert volatile is not required. During that stage of the reaction when the concentration of free volatile reactants and the rate of water formation has been reduced to a level where the desired boil-up rate cannot be maintained, the reaction mass is sparged with vaporous inert solvent to keep the boil-up rate at the desired level. The reduction in reaction cycle times is undoubtedly due to the increased agitation and speed of water removal caused by the relatively high boil-up rate throughout the reaction.

We have also found that the solvent sparge to the reactor could be made as a liquid. However, the vapor state is preferred. Adding the solvent as a liquid may result in reactor "bumping" caused by the violent flashing of the solvent as it enters the hot reaction mass. The addition of the solvent as a vapor is also beneficial when applying this invention to existing reactors where the heat transfer area available may not be sufficient to vaporize the quantities of solvent required to maintain the desired boil-up rates.

The process of the present invention can be applied to esterification reactions that are relatively rapid due to the high solubility of the carboxylic compound in the alcohol, such as phthalic anhydride in propylene glycol; as well as to esterifications that are lengthy due to the relative insolubility of the carboxylic compound in the alcohol such as isophthalic acid in propylene glycol.

The resinous materials prepared in the process of the present invention are identified generically as polyester resinous materials which result from the esterification of a polyhydric alcohol and a polycarboxylic acid. Although there are a substantial number of different kinds of these polyester resins, there are two principal commercial polyester resins to which the instant process is immediately applicable. One of these polyester resins is identified generally as an unsaturated polyester resin inasmuch as said resin is prepared by reacting a polyhydric alcohol and preferably a dihydric alcohol with an alpha, beta-ethylenically unsaturated polycarboxylic acid and preferably an alpha, beta-ethylenically unsaturated dicarboxylic acid. The second category of commercially available resinous materials to which the instant process would be applicable are the glyceride oil-modified alkyd resins. Each of these classes of resins will be discussed in greater detail hereinbelow. The unsaturated polyester resins produced in the present invention are subsequently blended with a polymerizable monomer and upon proper catalysis are converted to a thermoset condition into such useful materials as laminates, and the like. The glyceride oil-modified alkyd resins, on the other hand, are frequently styrenated in the presence of an inert solvent to produce coating compositions such as baking enamels, and the like.

In order to achieve substantially complete esterification of the polycarboxylic acid with the polyhydric alcohol, heating is continued at elevated temperatures in the range of about 150° C. to 320° C. and preferably from about 190° C. to 220° C. for unsaturated polyesters and from about 190° C. to about 260° C. for alkyd resins until a relatively low acid number is achieved. There is no significant criticality in the acid number although generally it is desired to continue the reaction until the acid number is dropped below 100 and preferably below 65. In the instance of unsaturated polyester resins, in which there is used an alpha, beta-ethylenically unsaturated dicarboxylic acid, it is frequently conventional in certain instances to continue the esterification reaction until the acid number has dropped below 10. To accomplish this, it is generally desired to utilize the polyhydric alcohol in an amount calculated, on a stoichiometrical basis, to be sufficient, and preferably in excess by 10% to 30% of the amount required, to completely esterify the acid component or components.

In the preparation of the polyester resins of the present invention, one may utilize any of the polyhydric alcohols such as ethylene glycol, propylene glycol, diethylene glycol, dipropylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, or the alkane diols such as butanediol-1,4, pentanediol-1,5, hexanediol-1,6, and the like. These polyhydric alcohols may be used either singly or in combination with one another. In the preparation of unsaturated polyester resin compositions where use is made of an alpha, beta-ethylenically unsaturated dicarboxylic acid, it is generally preferred that the polyhydric alcohol used be predominantly a dihydric alcohol although minor amounts up to about 10 to 25% of higher hydric alcohols such as trihydric, tetrahydric, hexahydric alcohols may be used. In the unsaturated polyester resins, it is generally desired that there be produced a linear polyester resin with polymerizable sites available for cross-linking with the polymerizably reactive monomer. For the purpose of making unsaturated polyester resins, then it can be seen that the diols, and more particularly the glycols, are preferred. When the blend of a dihydric alcohol with a polyhydric alcohol having more than two hydroxy groups are utilized, the average functionality of the alcohols used should not be significantly above about 2.25. In the preparation of alkyd resins including oil-modified alkyd resins, it is generally desired to utilize polyhydric alcohols having the functionality of 3 or more although dihydric alcohols may be used in combination with those polyhydric alcohols having three or more hydroxy groups. In making such an alkyd resin, the average functionality of the alcohols used should not be appreciably below about 2.75.

In the preparation of the polyester resins used in the process of the present invention whether they be unsaturated polyester resins or alkyd resins, one may utilize such polycarboxylic acids as those polycarboxylic acids which are free of non-benzenoid unsaturation including phthalic acid, isophthalic, oxalic acid, malonic acid, succinic acid, glutaric acid, sebacic acid, adipic acid, pimelic acid, suberic acid, azelaic acid, tricarballylic acid, citric acid, tartaric acid, malic acid and the like. Obviously, these acids may be used either singly or in combination with one another and the anhydrides of said acids, whenever available, may be used either singly or in combination with one another or in combination with the acids. Among the alpha, beta-ethylenically unsaturated polycarboxylic acids which may be used in the practice of the process of the present invention are maleic acid, fumaric acid, aconitic acid, itaconic acid, chloromaleic acid, and the like. The anhydrides of these acids may be used, whenever available. These acids and/or their anhydrides may be used either singly or in combination with one another. In the preparation of alkyd resins, it is generally conventional to utilize a polycarboxylic acid which is free of non-benzenoid unsaturation although minor amounts of alpha, beta-ethylenically unsaturated polycarboxylic acids may be used. Ordinarily, the polycarboxylic acid free of non-benzenoid unsaturation is used exclusively in the preparation of alkyd resins whether oil-modified or not, but up to about 10% on a mol basis of an alpha, beta-ethylenically unsaturated acid may be used, based on the total mols of polycarboxylic acid used, in alkyd resins. In the unsaturated polyester resins, it is desirable to utilize the alpha, beta-ethylenically unsaturated acids in an amount approximating at least 20% by weight of the total weight of the polycarboxylic acids used and preferably in amounts varying between about 25% and 65% by weight based on the total weight of polycarboxylic acid used, the balance being polycarboxylic acids free of non-benzenoid unsaturation.

In the manufacture of oil-modified alkyd resins, it is conventional to use any of the glyceride oils or the fatty acids of glyceride oils or their mono-glycerides. Among the glyceride oils which may be used in the production of the oil-modified alkyd resins are coconut oil, palm oil, babassu oil, murumuru oil, rape seed oil, mustard oil, olive oil, peanut oil, sesame oil, corn oil, cotton seed oil, soya oil, sunflower oil, walnut oil, linseed oil, perilla oil, castor oil, either raw or dehydrated, tung oil, oiticica oil, whale oil, menhaden oil, sardine oil, herring oil, and the like. Among the fatty acids derived from such oils which may be used in the manufacture of oil-modified alkyd resins are caproic acid, caprylic acid, capric acid, lauric acid, myristic acid, palmitic acid, stearic acid, arachidic acid, behenic acid, lignoceric acid, and the like. Certain unsaturated monocarboxylic acids derived from glyceride oils are utilized conventionally including myristoleic acid, palmitoleic acid, oleic acid, linolenic acid, linoleic acid, elaeostearic acid, licanic acid, ricinoleic acid, erucic acid, and the like. As these fatty acids are derived from these glyceride oils, they frequently occur in admixture with one another. The fatty acid component derived from tall oil may also be utilized in the manufacture of alkyd resins. This tall oil fraction is generally distilled one or more times in order to remove the rosin acid component, unsaponifiable materials, ash, and the like. The amount of oil utilized in the manufacture of oil-modified alkyd resins can be varied very considerably from short oil to medium oil or long oil classifications and may be nondrying, semi-drying or drying oils. These classifications are all well known in the art and further delineation of detail relating thereto is deemed to be unnecessary. Reference is made, however, to the publication "Organic Coating Technology," volume 1, by Henry Fleming Payne, published by John Wiley & Sons, Inc., in 1954. Attention is directed particularly to page 280, among other pertinent parts of the disclosure.

In these esterification reactions, no catalyst is necessary as the esterification proceeds quite smoothly without use thereof. However, if one wished to make use of an esterfication catalyst, there are a number of the same readily available in the art which would find application for this purpose. In the practice of the process of the present invention it is necessary to make use of a vaporized, normally-liquid, water-immiscible inert organic solvent and preferably one having a boiling point below about 150° C. When the reaction between the polyhydric alcohol and the polycarboxylic acid has begun in the reaction vessel, the polyhydric alcohol, being generally more volatile than the polycarboxylic acid, tends to vaporize when and as the temperature of reaction reaches its maximum esterification temperature. As the polyhydric alcohol volatilizes it begins to leave the reaction vessel at a certain vapor rate. This is particularly true when the polyhydric alcohol is one of the lower boiling glycols such as ethylene glycol, propylene glycol, diethylene glycol, trimethylene glycol, butanediol 1,3, butanediol-2,3 and the like. The normal boil-up rate at the beginning of the esterfication reaction approximates 10% of the reactive volume per minute in cubic feet. When this vapor rate or boil-up rate begins to decrease while under full heat, the reactants in the vessel are sparged with a vaporized inert solvent as described hereinabove and more fully hereinbelow. This sparging is accomplished automatically, continuously and almost instantaneously, initiating at the vapor rate drop so as to inibit the vapor rate decline. As the vapor rate, due to the volatilized reactants and more particularly the glycols, diminishes, the sparge of the volatilized inert solvent increases at least proportionately so as to maintain a total vapor rate due to the volatilized reactants plus the vaporized inert solvent at a substantially steady rate at full heat. The unreacted reactants and the vaporized inert solvent leaving the top of the reaction vessel will be passed through a distillation column in which the reactants are condensed out, the inert solvent and the water of esterification are removed from the top of the distillation column, condensed and the inert solvent may be collected in a solvent sump and refluxed back through the top of the column and/or passed through a vaporizer to the reaction kettle. The sparging is continued, with constant heating, until the desired acid number is reached. Thereupon the sparging is stopped and the reactants heated further to remove any entrapped volatilized inert solvent present in the reaction vessel.

The inert, organic, normally-liquid water-immiscible solvent having a boiling point below about 150° C. which may be used in the practice of the process of the present invention may be selected from any of the commercially available solvents meeting this description. Included in that group are benzene, toluene, xylene, ethyl benzene, methyl cyclohexane, cyclohexane, petroleum hydrocarbon cuts having a distillation temperature below about 150° C. and the like. These inert solvents may be used either singly or in combination with one another. The amount of vaporized solvent passed through the reactants in the reaction vessel can be varied above the normal boil-up rate, 3 times normal boil-up rate or 7 times normal boil-up rate or even higher.

When a polyhydric alcohol and a polycarboxylic acid are introduced into a suitable reaction vessel and heated to the temperature at which polyester resin formation is accomplished, said temperature will vary considerably depending upon the particular reactants utilized. In some instances, this temperature is reached at about 150° C. whereas in other instances, the esterification reaction begins to proceed rapidly at temperatures above 175° C. such as 185° C. and higher. This point in the reaction course can readily be observed by noticing a rapid evolution of water. Prior to this rapid evolution of water, there is doubtlessly being formed some significant measure of monoester. One can determine from experience at what temperature the rapid evolution of water will take place for a set of given reactants. In introducing the vaporized solvent into the reaction kettle, it is preferable to introduce it into the resin kettle at a point just beneath the agitator.

Reference is made to the accompanying drawing which is a simplified flow diagram and is virtually self-explanatory. The resin kettle is equipped with a stirrer, heating unit reactants inlet opening and an inlet tube for the introduction of the vaporized normally liquid inert organic solvent. Optionally the vessel may be equipped with a further inlet, also below the liquid level of the reactants in the vessel for recycling condensed unreacted reactants into the reaction sphere. Substantially at the top of the reaction vessel is an outlet tube through which the vapors of the reactants, the water of esterification and the vaporized solvent may pass upwardly and into the distillation column which is packed conventionally. The upper end of the distillation column is controlled and maintained at a temperature above the azeotropic temperature of the water of esterification in the vapor phase and the inert organic solvent. The mixture of water and organic solvent vapors removed from the distillation column is condensed and directed to a decanting vessel. The heavy aqueous layer is drawn off to discard while the light organic layer is drawn off to the solvent sump. More specifically, the process of the present invention will be carried out as follows using the apparatus shown in the accompanying drawing. Polyhydric alcohols and polycarboxylic acids are charged into the reactor. A small flow of inert gas is introduced into the reactor by setting control valve 1. The inert gas is used to sweep out oxygen from the reaction sphere while the reactants are brought up to heat. The agitator is started. Vapor flow controller 2 which can be any one of the available flow sensing-controlling devices available, but preferably one based on flow related to pressure drop across the distillation column is set to maintain a vapor flow rate equivalent to five times the normal inert gas rate. Flow controller 2 sensing essentially no vapor flow during the period of reactants heat-up, will activate the heat input valve 3 fully. Valve 3 will remain fully open until a temperature of 150° C. to 185° C. depending on the reactants utilized is reached. At this temperature the exothermic esterification reaction is underway with copious amounts of water and volatile reactants being released. The flow controller 2 will sense this vapor flow and will start regulating heat-input valve 3 to maintain the desired boil-up rate. The flow of inert gas is no longer required as an oxygen purge, and it is automatically shut off by the flow controller 2 closing inert gas valve 1. The vapor flow controller 2 can be connected to a coolant source for the reactor (not shown) and cooling medium if required can be introduced to control the exothermic heat liberation. As the esterification proceeds, the exotherm is passed and the volatile reactants are being consumed by the reaction. Due to the formation of esters, the boiling point of the mass is continually rising. To maintain the desired boil-up rate, the vapor flow controller 2 will be required to continually open heat-input control valve 3. At a temperature of 170° C. to 210° C. depending on the raw materials utilized, the concentration of free volatile reactants in the reaction mass is too low to maintain the desired boil-up rate, and heat-input valve will be open fully. At this time, an override on flow controller 2 will switch its point of control from heat-input valve 3 to controlling solvent addition, into the reaction mass through the vaporizer by regulating the solvent control valve 4. Control of heat-input valve 3 is simultaneously and automatically switched to reactor temperature controller 5. Temperature controller 5 is set to hold the reaction mass at the desired top heat temperature in the range of 190° C. to 220° C. for unsaturated polyesters, and will keep heat input control valve 3 fully open until the desired temperature is attained.

The override 6 on flow controller 2 is prevented from operating prematurely by adding the time delay 7 as indicated on drawing or any other available control device that will accomplish the same result. During initial reactant heating, heat-input valve 3 will be opened fully. When the reactants are up to reaction temperature and the vapor flow controller 2 senses increasing vapor flows, it will regulate heat-input valve 3. As the volatile reactants are consumed, it will be necessary for flow controller 2 to open heat-input valve 3 to maintain the desired boil-up rate. When heat-input valve 3 is open fully during this stage of the cycle (not during initial reactant heat-up) the override is allowed to switch control of vapor flow by 2 from heat-input control valve 3 to solvent sparge control valve 4. Control of heat-input control valve 3 is automatically switched to reactor temperature controller 5.

The desired boil-up rate is now maintained by the sparging of vaporized solvent into the reaction mass and is controlled by vapor flow controller 2 regulating solvent flow control valve 4. The quantity of solvent sparged will automatically and continuously increase as the volatile reactants are consumed. In this manner the water of reaction is continuously stripped from the reaction mass.

The vapors leaving the reactor are put into the lower portion of a distillation column. Into the top portion of the distillation column flows a controlled quantity of liquid solvent, called reflux, which passes down through the column. When this liquid solvent reflux comes into contact with the vaporous volatile reactants and water of reaction from the reactor, the solvent reflux is vaporized by condensing the higher boiling volatile reactants. Essentially all the vaporous water of reaction that enters the column with the volatile reactants remains as a vapor and is discharged from the column top with the vaporized solvent. The water-immiscible solvent and water form a heterogeneous azeotrope that boils, in the case of toluene as the solvent, at 84.1° C. If the column is maintained at a temperature above the azeotropic temperature, essentially complete water removal from the system is assured. The water and solvent vapors leaving the distillation column are condensed and decanted. The water is discarded and the solvent is forwarded to the solvent sump for reuse as a sparging medium or reflux, as required.

The flow of liquid reflux (added to the upper portion of the distillation column) is controlled by column temperature. Temperature controller 2 is set to control the flow of solvent reflux to the column by controlling reflux control valve 8. The control temperature desired is in the range of 1° C. to 3° C. above the boiling point of the solvent used. The temperature controller sensing element is so situated in the column so that when the desired temperature range is maintained, the temperature of the vapors leaving the distillation column is to be 5° C. to 15° C. above the boiling point of the water-solvent azeotrope during the early stages of the reaction when the boil-up rate can be maintained without a solvent sparge to the reactor. As the reaction progresses, the vapors into the distillation column will become less concentrated in volatile reactants and water, and more concentrated in solvent. As the ratio of solvent to water concentration in the vapors into the column increases, the top of the column vapor temperature will increase and approach the control temperature maintained by 9. The control temperature of 1° C. to 3° C. above the boiling point of the solvent used will prevent higher boiling volatile reactant vapors from passing through this zone, and lower boiling water-solvent azeotrope from condensing. In this way volatile reactants are condensed in the column and water is removed from the system.

The column bottoms will be continuously removed and recycled to the reactor. This stream can be combined with the solvent sparge stream and vaporized through the vaporizer, as shown, or it can be put directly back to the reaction sphere as a liquid.

When the desired specifications of the polyester are attained, the solvent sparge and reflux are discontinued. Any residual solvent can be stripped out of the polyester with inert gas or by vacuum or a combination of both. The solvent so stripped is condensed and added to the solvent sump for reuse. When solvent stripping is completed, the heat input to the reactor is shut off and the polyester may then be removed from the reactor for further processing if required.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example I*

This example will illustrate the concept of the present invention as applied to the processing of a general purpose polyester resin.

Into a suitable reaction vessel, equipped as shown in the accompanying drawing, there is introduced 1610 parts of 99.5% propylene glycol, 1480 parts of phthalic anhydride and 980 parts of maleic anhydride. A low inert gas flow and agitator are started. The vapor flow controller 2 is set to give a vapor rate equivalent to 50% of the reactor volume contents per minute, in cubic feet. The reactor temperature controller 5 is set to maintain a temperature of 210° C.

The vapor flow controller 2 sensing very little vapor flow will open the heat-input control valve 3 fully. The charge is heated to 100° C. where the exothermic reaction liberates enough heat to quickly raise the temperature of the reaction mass to 150° C. At 150° C. copious amounts of water and volatile reactant vapors are liberated. The vapor flow controller 2 sensing the increasing vapor flow, automatically closes the inert gas control valve 1 and starts to throttle heat-input control valve 3 to maintain the boil-up rate at the desired level. As the exothermic heat liberation diminishes, the boil-up rate is maintained by heat-input control valve 3 being opened by flow controller 2. At about 170° C. a major part of the volatile reactants has been consumed and in order to maintain the desired boil-up rate, heat-input valve 3 has been opened fully. When the boil-up rate begins to decline, due to the depletion of volatile reactants, the flow controller 2 will sense the vapor rate fall-off, and the vapor flow controller override will switch from controlling heat-input valve 3 to controlling solvent sparging control valve 4. The control of heat-input valve 3 will be put on reactor temperature controller 5. The temperature controller 5 set at 210° C. will keep heat-input valve 3 open fully until this temperature is reached and will then regulate 3 to maintain 210° C.

The desired boil-up rate will now be maintained by controlling the flow of liquid toluene control valve 4 passing the liquid toluene through the vaporizer and then sparging it into the reaction mass in the vicinity below the agitator. The quantity of vaporized toluene thus sparged will increase as the quantity of volatile reactants and water of reaction vapors decreases. When the reaction mass reaches and is maintained at 210° C. the boil-up from the reactor will consist mainly of toluene vapor plus small amounts of water and volatile reactants.

The vapors from the reaction sphere are introduced into the lower portion of the distillation column. The volatile reactants are condensed on contact with lower boiling liquid toluene, put into the column top as reflux. The condensed volatile reactants are recycled back to the reactor from the column bottom.

The flow of toluene reflux is controlled by reflux control valve 8 activated by column temperature controller 9. The column temperature controller is set to maintain a temperature of 111° C. and is so situated in the column that the temperature of the vapors leaving the column top, during the period of the reaction when free boiling exists in the reactor is about 97° C. The liquid toluene reflux condenses the higher boiling volatile reactants entering the lower portion of the distillation column, and in so doing is vaporized. The toluene and water vapors leaving the column top are condensed and decanted. The water is discarded and the toluene is forwarded to the solvent sump to be reused as reaction mass sparging medium or column reflux as required.

The reaction mass is maintained at 210° C. until the polyester is completed (indicated by an acid number of less than 65). The solvent reflux and sparge is discontinued and residual solvent in the polyester is stripped with inert gas. Heat-input to the reactor is discontinued and the polyester is ready for further processing, as required.

The above general purpose resin was made with a 5% molar excess of propylene glycol in a total reaction cycle time, heat-on to heat-off, of 6 hours. Using ordinary inert gas cooking procedures, i.e., stripping water of reaction with standard flow of inert gas, a 10% molar excess of propylene glycol would be required to obtain a polyester with similar physical properties, and a heat on to heat off time of 15 hours would be needed.

*Example II*

This example will illustrate the concept of the present invention as applied to the processing of a polyester resin made with relatively insoluble isophthalic acid. When processing isophthalic acid-maleic anhydride based resins, the isophthalic acid is pre-esterified, and then the maleic anhydride acid is added for a final esterification step.

Into a suitable reaction vessel there is to be charged 1623 parts of 99.5% propylene glycol, 2240 parts of isophthalic acid and 657 parts of maleic anhydride. Both the low inert gas rate required for oxygen purging and the boil-up rate control will be based on the volume of total reactants.

The propylene glycol and isophthalic acid are charged to the reactor. A low flow of inert gas is set. The vapor flow controller 2 is set to maintain a reactor boil-up rate equivalent to 50% of the reactant volume per minute, in cubic feet. The reactor temperature controller is set to 215° C.

Vapor flow controller 2 sensing very low flow opens heat-input valve 3 fully. The propylene glycol-isophthalic acid mixture is heated to 185° C. where the esterification reaction begins and the mixture begins to boil. Vapor flow controller 2 will begin to regulate heat-input valve 3 to maintain the desired boil-up rate. The inert gas will be automatically shut off.

The propylene glycol and water of reaction vapors leaving the reactor enter the bottom of the distillation column and the column temperature begins to rise. The column temperature controller 9 is set to maintain 82° C. slightly higher than the boiling point of benzene, and so situated in the column that the temperature of the vapors leaving is in the range of 5° C. to 15° C. above the boiling point of benzene-water azeotrope temperature of 69.3° C. Temperature controller 9 will control the flow of benzene reflux by regulating reflux control valve 8. The benzene reflux will condense the higher boiling volatiles in the column and in so doing will be itself vaporized. The benzene and water vapors leaving the top of the distillation column are condensed and decanted. The water is discarded and the benzene is forwarded to the solvent sump. The condensed volatiles leave the column bottom and are returned to the reactor.

The batch temperature raises to approximately 200° C. during the pre-esterification of the isophthalic acid. During the entire pre-esterification reaction there is enough propylene glycol in the mass to maintain the boil-up rate desired. Therefore, benzene vapor sparging of the mass to remove water of reaction is not required.

The reaction is carried on until an acid number of 50 or lower is attained. When the desired acid number is reached, the maleic anhydride is charged to the reaction mass. The free propylene glycol is quickly tied up in the esterification of the maleic anhydride and the vapor rate leaving the reactor will begin to diminish. The vapor flow controller 2 sensing the decrease in vapor flow will attempt to compensate by opening heat-input valve 3 fully. When valve 3 is fully open, the override on the vapor flow controller 2 will switch control from heat-input to reaction sphere to benzene addition to the reaction sphere by controlling benzene sparge control valve 4. The control of heat-input valve 3 will be switched to reactor batch temperature controller 5. Temperature controller 5 set at 215° C. will maintain heat-input valve 3 fully open until the desired temperature is attained. Temperature controller 5 will then regulate heat-input value 3 to hold this temperature.

Thus the reaction mass is maintained at the desired temperature while vapor flow controller 2 maintains the boil-up rate by regulating benzene sprage control valve 4 which controls the flow of liquid benzene to the vaporizer. The vaporized benzene is continuously sparged through the reaction mass and strips water of reaction as it is formed. The quantity of benzene fed to the reactor through the vaporizer will increase as the amounts of volatile reactants and water of reaction decrease.

The benzene is sparged through the reaction mass until the polyester is at the desired specification of acid number below 65. Benzene sparge and benzene reflux to the column is then stopped. Residual benzene is stripped from the reaction mass, condensed and forwarded to the solvent sump. Reactor heat-input is shut off and the polyester is ready for further processing if required.

The above isophthalic polyester was made with a 5% molar excess of proylene glycol. The preesterification of isophthalic acid was accomplished in 5.5 hours and the final esterification in 5.5 hours for a total reaction cycle of 11 hours. Using ordinary inert gas methods a 10% molar excess of glycol would be required and a total reaction cycle of 24 hours needed; 14.4 hours for the pre-esterification and 9.6 hours for the final esterification.

*Example III*

This example will illustrate the concept of this invention as applied to the processing of an alkyd resin.

Into the resin kettle, there is charged 1015 parts of 98% glycerol, 2800 parts of linseed fatty acid and 1480 parts of phthalic anhydride. A low inert gas flow and agitation is started. The vapor flow controller 2 is set to maintain the desired boilup rate and reactor temperature controller 5 is set for 260° C. The vapor flow controller 2 sensing a small vapor flow will open heat-input control valve 3 fully. The charge is heated to about 170° C. to 200° C. where the esterification reaction proceeds rapidly with evolution of copious amounts of water and volatile reactant vapors. Vapor flow controller 2 will regulate heat-input valve 3 to maintain the desired boil-up rate. When the reaction mass attains 200° C. to 215° C. most of the volatile reactants are combined and to maintain boil-up rate, heat-input valve 3 is fully opened by vapor flow controller 2. At this instant, the flow controller 2 override switches control to xylene sparge control valve 4 which regulates the flow of xylene through the vaporizer to be sparged through the reaction mass; and heat-input control is put on reactor temperature controller 5. The reactor temperature controller 5 set for 260° C. will keep heat-input valve 3 fully open until this temperature is reached and will then regulate valve 3 to maintain this temperature.

The vapors from the reactor are forwarded to the distillation column. The volatile rectants are condensed in the distillation column by coming into contact with the lower boiling liquid xylene reflux. The rate of xylene reflux addition to the column is controlled by reflux control valve 8, actuated by column temperature controller 9. The column temperature controller 9 is set to maintain a temperature of 140° C. to 142° C. and is so situated in the column that a top temperature of 97° C. to 107° C. is attained during the reaction period when free boiling exists in the reactor. The condensed volatile reactants are recycled back to the reaction sphere. The xylene-water vapors are taken overhead, condensed and decanted. The water is discarded and the xylene forwarded to the solvent sump for reuse as required.

The reaction mass is maintained at 260° C. and continuously sparged with xylene vapors to remove water of reaction as it is formed, until the desired resin properties are reached. The xylene sparge and reflux is discontinued when an acid number of less than 10 is attained with a Gardner-Holt viscosity at U-X, measured at 25° C. as a 70% solids solution in mineral spirits. Any residual xylene is stripped from the reaction mass, condensed and collected in the solvent sump. Heat-input to the reactor is shut off.

The above resin was made with an 18% molar excess of glycerol in a total reaction time of 10 hours. Using normal inert gas processing techniques an 18% molar excess of glycerol would be required with a reaction cycle time of 20 hours.

We claim:

1. A process for the preparation of a polyester resin comprising heating a polyhydric alcohol and a polycarboxylic acid to the esterification temperature and continuing said heating until the vapor rate, at full heat, begins to decline, thereupon, while continuing full heat, continually introducing a sparge of vaporized, normally-liquid, inert water-immiscible organic solvent having a boiling point below about 150° C. into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content volume per minute, in cubic feet, by means of said sparge.

2. A process for the preparation of a polyester resin comprising heating a glycol and an alpha, beta-ethylenically unsaturated polycarboxylic acid to the esterification temperature and continuing said heating until the vapor rate, at full heat, begins to decline, thereupon, while continuing full heat, continually introducing a sparge of vaporized, normally-liquid, inert water-immiscible organic solvent having a boiling point below about 150° C. into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content volume per minute, in cubic feet, by means of said sparge.

3. A process for the preparation of a polyester resin comprising heating a glycol and maleic anhydride to the esterification temperature and continuing said heating until the vapor rate, at full heat, begins to decline, thereupon, while continuing full heat, continually introducing a sparge of vaporized, normally-liquid, inert water-immiscible organic solvent having a boiling point below about 150° C. into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content volume per minute, in cubic feet, by means of said sparge.

4. A process for the preparation of a polyester resin comprising heating a glycol and fumaric acid to the esterification temperature and continuing said heating until the vapor rate, at full heat, begins to decline, thereupon, while continuing full heat, continually introducing a sparge of vaporized, normally-liquid, inert water-immiscible organic solvent having a boiling point below about 150° C. into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content volume per minute, in cubic feet, by means of said sparge.

5. A process for the preparation of a polyester resin comprising heating a polyhydric alcohol and a polycarboxylic acid to the esterification temperature and continuing said heating until the vapor rate, at full heat, begins to decline, thereupon, while continuing full heat, continually introducing a sparge of vaporized benzene into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content volume per minute, in cubic feet, by means of said sparge.

6. A process for the preparation of a polyester resin comprising heating a polyhydric alcohol and a polycarboxylic acid to the esterification temperature and continuing said heating until the vapor rate, at full heat, begins to decline, thereupon, while continuing full heat, continually introducing a sparge of vaporized toluene into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content, volume per minute, in cubic feet, by means of said sparge.

7. A process for the preparation of a polyester resin comprising heating a glycol and an aliphatic alpha, beta-ethylenically unsaturated polycarboxylic acid to the esterification temperature and continuing said heating until the vapor rate, at full heat, begins to decline, thereupon, while continuing full heat, continually introducing a sparge of vaporized benzene into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content volume per minute, in cubic feet, by means of said sparge.

8. A process for the preparation of a polyester resin comprising heating a glycol and an alpha, beta-ethylenically unsaturated polycarboxylic acid to the esterification temperature and continuing said heating until the vapor rate, at full heat, begins to decline, thereupon, while continuing full heat, continually introducing a sparge of vaporized toluene into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content volume per minute, in cubic feet, by means of said sparge.

9. A process for the preparation of a polyester resin comprising heating a glycol, an alpha, beta-ethylenically unsaturated dicarboxylic acid and a dicarboxylic acid free from non-benzenoid unsaturation to the esterification temperature and continuing said heating until the vapor rate, at full heat, begins to decline, thereupon, while continuing full heat, continually introducing a sparge of vaporized, normally-liquid, inert water-immiscible organic solvent having a boiling point below about 150° C. into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content volume per minute, in cubic feet, by means of said sparge.

10. A process for the preparation of a polyester resin comprising heating propylene glycol, maleic anhydride and phthalic anhydride to the esterification temperature and continuing said heating until the vapor rate, at full heat, begins to decline, thereupon, while continuing full heat, continually introducing a sparge of vaporized, normally-liquid, inert water-immiscible organic solvent having a boiling point below about 150° C. into the reaction vessel, below the liquid level of the reaction mixture, at a continuously controlled rate so as to prevent vapor rate decline, continuing said heating and vapor rate control until the acid number of the polyester resin is at least below 65, stopping the inert vapor sparge and removing substantially all of the inert organic solvent, wherein the vapor rate leaving the reaction mass, during the reaction cycle, beginning with vapor rate decline at full heat, is maintained at about 30% to about 70% of the reactor content volume per minute, in cubic feet, by means of said sparge.

References Cited in the file of this patent

UNITED STATES PATENTS

| | | |
|---|---|---|
| 2,892,812 | Helbing | June 30, 1959 |
| 2,993,029 | Georgian et al. | July 18, 1961 |
| 3,039,980 | Mallison | June 19, 1962 |